(12) United States Patent
Whitney et al.

(10) Patent No.: US 6,576,887 B2
(45) Date of Patent: Jun. 10, 2003

(54) LIGHT GUIDE FOR USE WITH BACKLIT DISPLAY

(75) Inventors: Leland R. Whitney, St. Paul, MN (US); Gary T. Boyd, Woodbury, MN (US); Keith M. Kotchick, St. Paul, MN (US); Kenneth A. Epstein, St. Paul, MN (US); Sanford Cobb, Jr., Lakeland, MN (US); Philip E Watson, Oakdale, MN (US); David J. Lamb, Oakdale, MN (US); Mark E. Gardiner, Santa Rosa, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 47 days.

(21) Appl. No.: 09/930,371

(22) Filed: Aug. 15, 2001

(65) Prior Publication Data

US 2003/0034445 A1 Feb. 20, 2003

(51) Int. Cl.[7] .............................. G01J 1/04; G01J 1/42; G01J 5/08
(52) U.S. Cl. .................. 250/227.11; 385/133; 385/147; 385/901
(58) Field of Search ........................ 250/208.1, 227.11, 250/227.28–227.32, 235, 214, 216; 359/222, 298, 837; 385/133, 146, 901, 36, 147, 37; 362/26, 31, 326, 330, 337

(56) References Cited

U.S. PATENT DOCUMENTS

| | | |
|---|---|---|
| 4,542,449 A | 9/1985 | Whitehead |
| 4,751,615 A | 6/1988 | Abrams |
| 4,799,137 A | 1/1989 | Aho |
| 4,811,507 A | 3/1989 | Blanchet |
| 4,874,228 A | 10/1989 | Aho et al. |
| 4,906,070 A | 3/1990 | Cobb, Jr. |
| 4,984,144 A | 1/1991 | Cobb, Jr. et al. |
| 5,005,108 A | 4/1991 | Pristash et al. |
| 5,040,883 A | 8/1991 | Cobb, Jr. |
| 5,050,946 A | 9/1991 | Hathaway et al. |
| 5,054,885 A | 10/1991 | Melby |
| 5,161,041 A | 11/1992 | Abileah et al. |
| 5,190,370 A | 3/1993 | Miller et al. |
| 5,359,691 A | 10/1994 | Tai et al. |
| 5,396,350 A | 3/1995 | Beeson et al. |
| 5,428,468 A | 6/1995 | Zimmerman et al. |
| 5,485,354 A | 1/1996 | Ciupke et al. |
| 5,506,929 A | 4/1996 | Tai et al. |
| 5,555,109 A | 9/1996 | Zimmerman et al. |
| 5,555,329 A | 9/1996 | Kuper et al. |

(List continued on next page.)

FOREIGN PATENT DOCUMENTS

| | | |
|---|---|---|
| EP | 0 802 446 A1 | 10/1997 |
| GB | 2 337 628 A | 11/1999 |
| WO | WO 01/27527 A1 | 4/2001 |

*Primary Examiner*—David Porta
*Assistant Examiner*—Patrick J. Lee
(74) *Attorney, Agent, or Firm*—Stephen W. Buckingham (57) ABSTRACT

A light guide including a light guide body having a light re-directing side positioned opposite from a light output side. A plurality of elongate prisms are located adjacent the light output side of the light guide body. The prisms extend side-by-side relative to one another along lengths. The prisms include upper edges defining heights of the prisms. The upper edges extend along the lengths of the prisms. Each upper edge includes a plurality of edge segments having different magnitudes of slope. The light guide also includes a plurality of light extraction structures located adjacent the light re-directing side of the light guide body for reflecting light toward the light output side. The light extraction structures include elongated projections each having a plateau segment and first and second facets. The elongated projections are separated by lands that are recessed relative to the plateau segments. The first and second facets extend from the plateau segments to the lands.

38 Claims, 9 Drawing Sheets

U.S. PATENT DOCUMENTS

| | | |
|---|---|---|
| 5,594,830 A | 1/1997 | Winston et al. |
| 5,608,550 A | 3/1997 | Epstein et al. |
| 5,608,837 A | 3/1997 | Tai et al. |
| 5,613,751 A | 3/1997 | Parker et al. |
| 5,668,913 A | 9/1997 | Tai et al. |
| 5,671,994 A | 9/1997 | Tai et al. |
| 5,779,337 A * | 7/1998 | Saito et al. .................. 362/31 |
| 5,835,661 A | 11/1998 | Tai et al. |
| 5,894,539 A | 4/1999 | Epstein et al. |
| 5,999,685 A * | 12/1999 | Goto et al. ................ 385/146 |
| 6,259,854 B1 * | 7/2001 | Shinji et al. ............... 385/146 |

\* cited by examiner

Fig. 17

LIGHT GUIDE FOR USE WITH BACKLIT DISPLAY

TECHNICAL FIELD

The present invention relates to optical devices such as light guides. More particularly, the present invention relates to light guides for use with backlit displays.

BACKGROUND ART

A variety of devices have been proposed for illuminating electronic displays. These devices include backlighting panels, front lighting panels, concentrators, reflectors, structured-surface films and other optical devices for redirecting, collimating, distributing or otherwise manipulating light.

Efficient use of the light is particularly important in battery powered electronic displays such as those used in cell phones, personal digital assistants and laptop computers. By improving lighting efficiency, battery life can be increased and/or battery sizes can be reduced. Prismatic films are commonly used improve lighting efficiency and enhance the apparent brightness of a backlit liquid crystal display.

Display quality is also an important consideration in electronic displays. One measure of display quality for a backlit display is brightness uniformity. Because displays are typically studied closely or used for extended periods of time, relatively small differences in the brightness can easily be perceived. These types of variances in brightness can be distracting or annoying to a user. To soften or mask non-uniformities, a light scattering element (e.g., a diffuser) can sometimes be used. However, such scattering elements can negatively affect the overall brightness of a display.

SUMMARY OF INVENTION

Although a number of backlight designs have been proposed, there is an ongoing need for more efficient designs and for reduced power consumption. The present invention relates generally to backlit displays that efficiently use light and concurrently are capable of providing high levels of brightness uniformity.

One aspect of the present invention relates to a light guide including a light guide body having a light re-directing side positioned opposite from a light output side. A plurality of elongate prisms are located adjacent the light output side of the light guide body. The prisms extend side-by-side relative to one another along lengths. The prisms include upper edges defining heights of the prisms. The upper edges extend along the lengths of the prisms. Each upper edge includes a plurality of edge segments having different magnitudes of slope. The light guide also includes a plurality of facets located adjacent the light re-directing side of the light guide body for reflecting light toward the light output side. Generally flat surfaces are located between the facets for reflecting light along the length of the light guide by total internal reflection. In certain embodiments, the light re-directing side of the light guide can include recessed lands positioned between plateau segments. In such embodiments, first and second facets extend from the plateau segments to the lands.

Another aspect of the present invention relates to a backlit display having a light source and a light gating device (e.g., a liquid crystal display (LCD)). A light guide as described above is positioned behind the light gating device for directing light from the light source to the light gating device. In alternate embodiments, one or more optical elements (e.g., transmissive diffusers, polarizing films, reflective polarizing films, prismatic brightness enhancing films, etc.) can be positioned between the light guide and the light gating device. In other embodiments, a reflective element (e.g., a reflective diffuser, a polarization converter, etc.) can be positioned behind the light guide.

The various aspects of the present invention have particular applicability to recycling backlit displays. A typical recycling backlit display includes a light guide, a reflector positioned behind the light guide, and one or more light recycling structures positioned in front of the light guide. The light recycling structures reflect light of a selected type (e.g., light that does not have a selected polarization or is outside a predetermined viewing angle) back into the light guide to allow the reflected light to be re-used. The various aspects of the present invention also are applicable to one-pass backlit displays.

DETAILED DESCRIPTION

The present invention relates generally to light guides or extractors for use with backlit displays. The light guides of the invention are particularly useful as point to area or line to area back light guides for subminiature or miniature display devices illuminated with light emitting diodes (LEDs) powered by small batteries. Suitable display devices include color or monochrome LCD devices for cell phones, pagers, personal digital assistants, clocks, watches, calculators, laptop computers, vehicular displays and the like. Other display devices include flat panel displays such as laptop computer displays or desktop flat panel displays. In addition to LEDs, other suitable illumination sources include fluorescent lamps (e.g., cold cathode fluorescent lamps) incandescent lamps, electroluminescent lights and the like.

I. General Backlit Display

Figure 1:
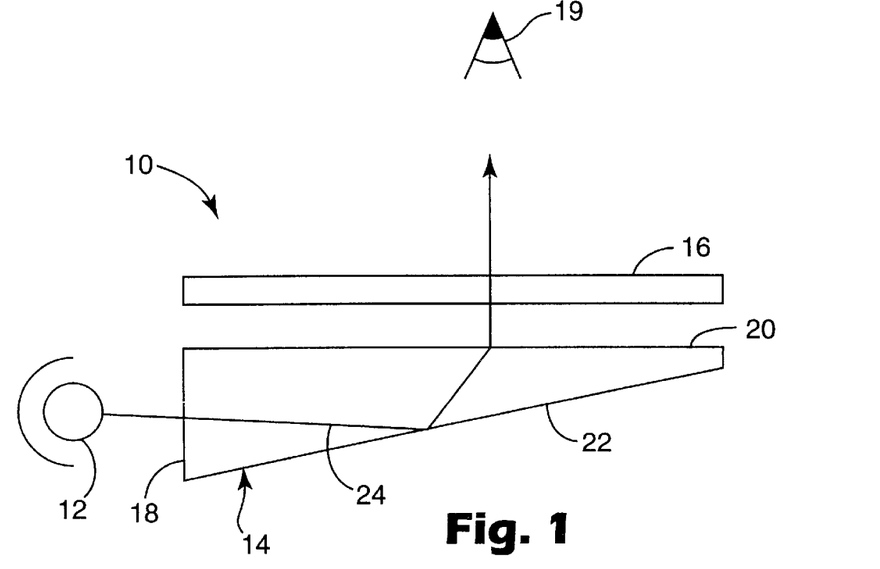
FIG. 1 is a schematic view of a backlit display in accordance with the principle of the present invention, the display includes a light source, a light guide and a light gating device.
Figure 4:
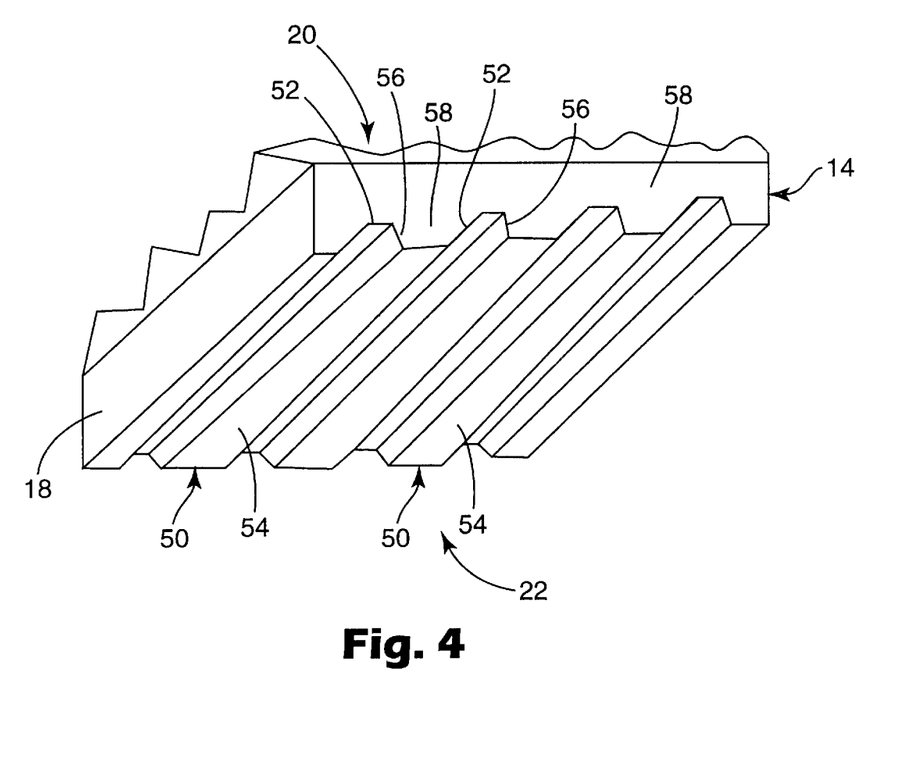
FIG. 4 is a bottom, perspective view of a light guide in accordance with the principles of the present invention.

FIG. 1 schematically shows a backlit display 10 constructed in accordance with the principles of the present invention. The display includes a light source 12 (e.g., a line light source such as a fluorescent tube or a plurality of LEDs), a light guide 14 and a light gating device 16 (e.g., an LCD). The light guide 14 is positioned behind the light gating device 16 and functions to convert the line light source 12 into an area light source. The light guide 14 includes a light input side 18 positioned adjacent to the light source 12, a light output side 20 that faces toward the light gating device 16, and a light re-directing side 22 positioned opposite from the light output side 20. As described at Sections II and III of this Detailed Description, the light re-directing side 22 preferably includes extraction structures (e.g., microstructures) for extracting light from the light guide 14 and the light output side 20 includes structure for changing the output angle of at least some of the light that exits the light guide 14.

In use of the display 10, a light ray 24 from the light source 12 enters the light guide 14 through the light input side 18 and propagates through the light guide via total internal reflection (TIR). The light ray 24 continues to be internally reflected within light guide 14 until the ray strikes a surface at an angle less than the critical angle. This may be caused by the taper of the light guide or through reflection by an extraction structure (shown in FIG. 4 as projection 50) provided at the light re-directing side 22. When the ray 24 is reflected upwardly at an angle that frustrates TIR (i.e., when the ray strikes the output side 20 at an angle less than the critical angle), the ray 24 exits the light guide 14 by refraction through the light output side 20. After refracting through the light output side 20, the light ray 24 passes through the light gating device 16 (assuming that gating device 16 is suitably modulated to transmit light) towards a viewer 19.

Figure 2:
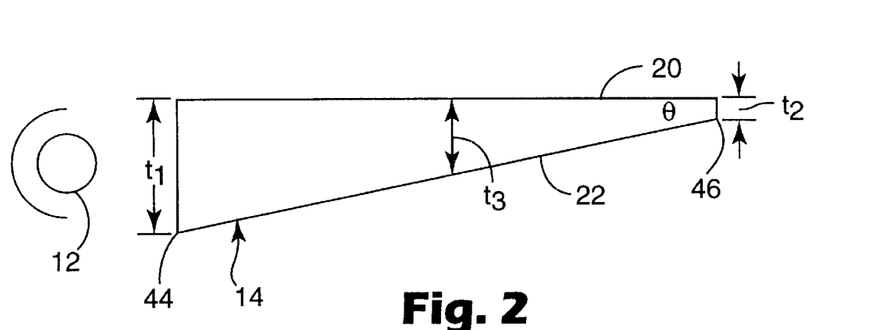
FIG. 2 is a schematic view of the light guide of FIG. 1.

Referring to FIG. 2, the light guide 14 preferably has a wedge shape. The phrase "wedge shape" will be understood to mean that a first end 44 (i.e., a proximal end or the end closest to the light source) of the light guide 14 is thicker than a second end 46 (i.e., a distal end or the end furthest from the light source) of the light guide 14. As shown in FIG. 2, the thickness of the light guide 14 gradually tapers from an enlarged thickness $t_1$ at the first end 44 to a reduced thickness $t_2$ at the second end 46. By way of non-limiting example, for applications such as laptop computers, the light guide 14 can have a nominal thickness $t_3$ in the range of 1–3 millimeters, and a taper angle θ in the range of 0.25 degrees to 1.5 degrees. It will be appreciated that the thickness can vary proportionally with the intended viewing area of the display (i.e., larger displays will typically have thicker light guides than smaller displays). While a wedge shape is preferred, light guides having other shapes (e.g., a slab of relatively constant thickness) could also be used.

The light guide 14 preferably has a solid construction and is made of an optically suitable material such as polycarbonate, polyacrylates such as polymethyl methacrylate, polystyrene, glass, or any number of different plastic materials having relatively high refractive indexes (e.g., refractive indexes in the range of 1.45 to 1.7).

Figure 3:
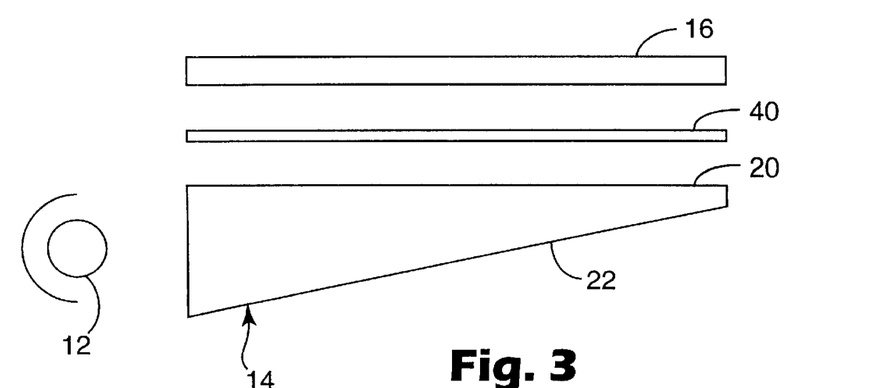
FIG. 3 is a schematic view of the backlit display of FIG. 1 with a diffuse transflective film positioned between the light guide and the light gating device.

Referring to FIG. 3, the gating device 16 of the display 10 can include an LCD having transflective mirror electrodes that reflect ambient light for viewing in well lit conditions, and transmit light from the light source 12 for viewing in dim light conditions. Alternatively, the LCD can be strictly transmissive such that the light source is required at all times for viewing. In still another embodiment, an optical element 40 in the form of a diffuse transflective film (e.g., a product sold by Minnesota Mining and Manufacturing under the name TDF) can be mounted behind the gating device 16 (see FIG. 3).

Figure 15:
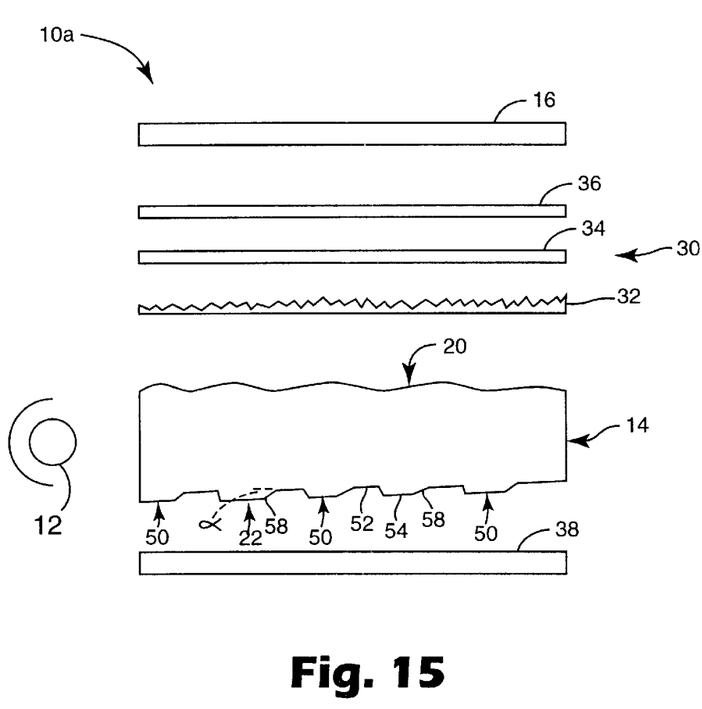
FIG. 15 schematically depicts a recycling display in accordance with the principles of the present invention.
Figure 16:
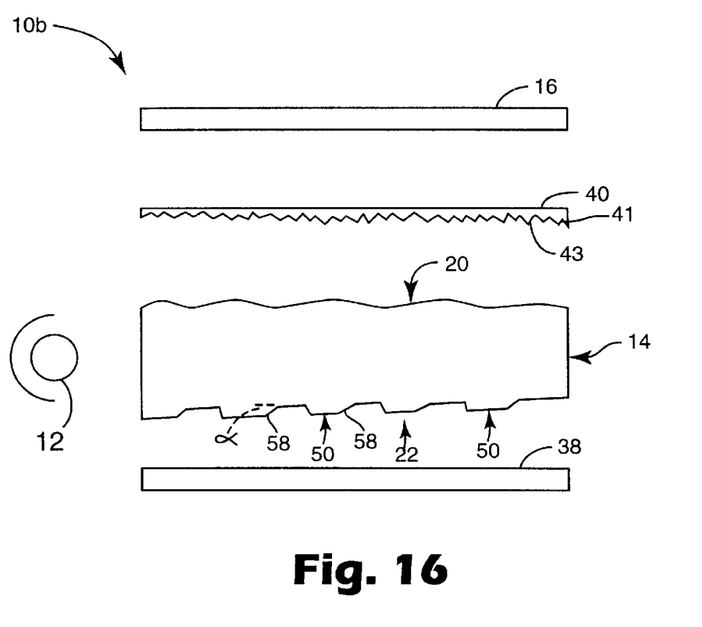
FIG. 16 schematically depicts a one-pass display in accordance with the principles of the present invention.

A light guide in accordance with the principles of the present invention has particular applicability in a recycling display device. An exemplary recycling display device is shown at FIG. 15. A light guide in accordance with the principles of the present invention can also be used in a one-pass display device. An exemplary one-pass display device is shown at FIG. 16.

II. Light Re-Directing Side of Light Guide

Referring to FIG. 4, the light re-directing side 22 of the light guide 14 includes a plurality of elongated projections 50 positioned in parallel and side-by-side relation to one another. The projections 50 are separated by lands 52. Each projection 50 includes a plateau segment 54, a leading facet 56 (i.e., a facet closer to the light source) and trailing facet 58 (i.e., a facet farther from the light source). The trailing facets 50 can also be reformed to as extractor facets. The lands 52 are preferably recessed (i.e., in-set) relative to the plateau segments 54. The facets 56 and 58 extend from the plateau segments 54 to the lands 52 and also extend along the lengths of the projections 50. The term "plateau segment" will be understood to mean a generally flat segment offset from adjacent lands (i.e., generally flat segments on opposite sides of the plateau segment) by relatively steep offset elements (e.g., facets 56 and 58). The term "generally flat segments" includes segments having slight curvatures (e.g., curvatures that vary the slope of the flat segments less than 10 percent). Preferably, the generally flat segments of the lands 52 are substantially free of extraction structures and are sufficiently flat so as to promote propagation of light through the light guide 14 by total internal reflection. The term "relatively steep" will be understood to mean that the facets 56 and 58 have a slope that is relatively steep as compared to the slopes of the plateau segments 54 and the lands 52.

As shown in FIG. 4, the plateau segments 54 are downwardly offset from the lands 52. In some embodiments, the areas of the plateau segments 54 are larger than the areas of the adjacent lands 52. Thus, at the light re-directing side 22, the total area of the plateau segments 54 is greater than the total area of the lands 52. In some embodiments, the total area of the plateau segments 54 can be at least eight times as great as the area of the lands 52. Of course, in other embodiments, the areas of the lands 52 can be greater than the areas of the plateau segments 54.

Figure 5:
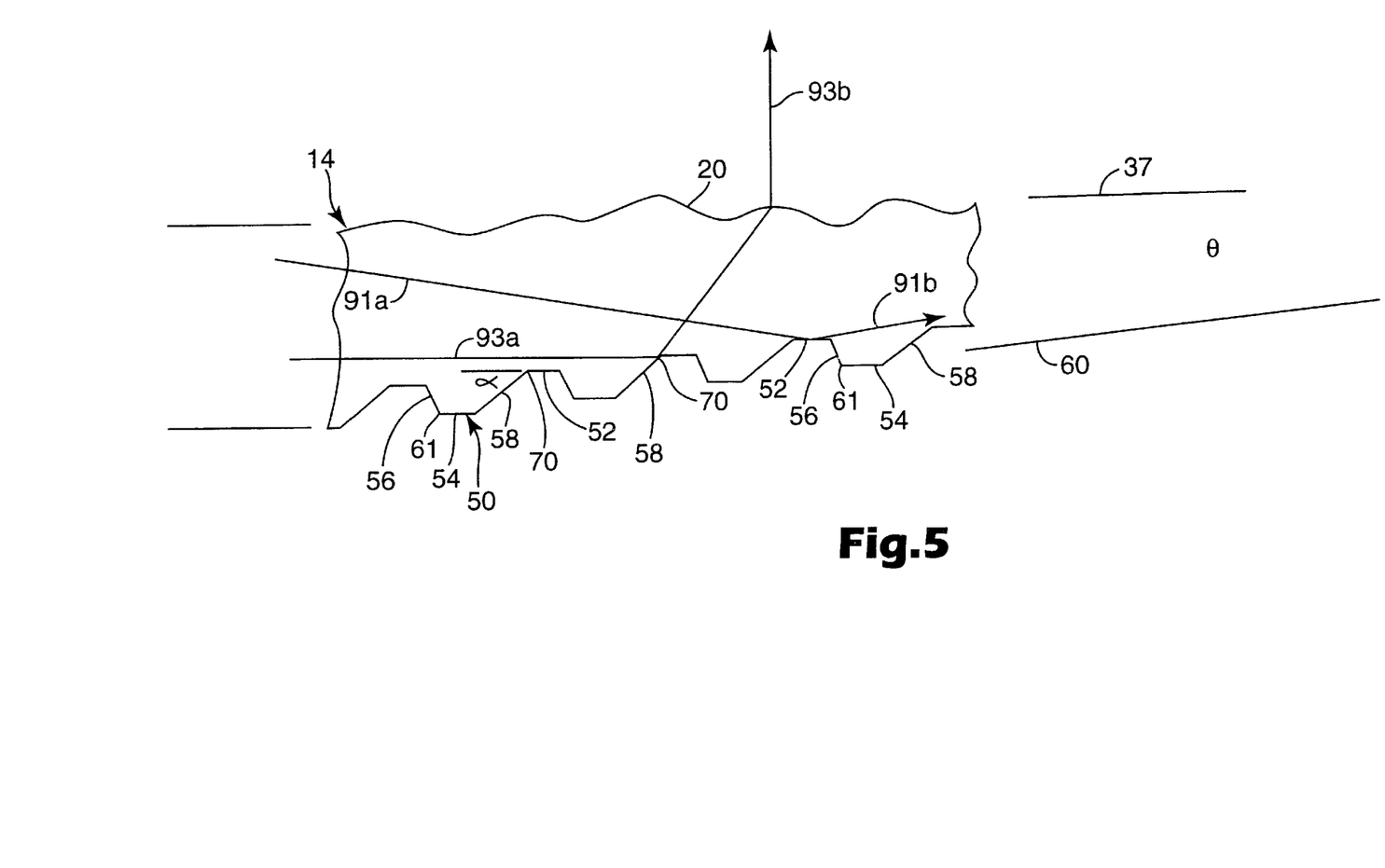
FIG. 5 is a partial side view of the light guide of FIG. 4.

FIG. 5 shows the light guide 14 with an imaginary line 60 drawn through vertices 61 formed at the intersections of the leading facets 56 and the plateau segments 54. Imaginary line 60 forms an angle θ with a line 37 drawn through the nominal reference plane (e.g., the plane perpendicular to the normal viewing angle of the light guide 14) formed by the light output side 20 of the light guide 14. As shown in FIG. 5, the plateau segments 54, the lands 52 and the facets 56, 58 are all preferably planar. The facets 56, 58 define oblique angles relative to the lands 52 and the plateau segments 54. The lands 52 and the plateau segments 54 are preferably substantially parallel to the imaginary line 37. The trailing facets 58 include primary reflector portions 70 that extend upwardly higher than their respective leading facets 56. In the embodiment of FIG. 5, the primary reflector portions 70 are provided by constructing the trailing facets 58 longer (i.e., taller) than the leading facets 56. As shown in FIG. 5, the trailing facets 58 define an angle α relative to the lands 52 and the reference plane 37. For recycling displays, the angle α is preferably in the range of 20–40 degrees, more preferably in the range of 25–35 degrees and most preferably in the range of 25–30 degrees. For one-pass displays, the angle α is preferably less than 20 degrees, more preferably less than 15 degrees and most preferably less than 10 degrees.

FIG. 5 also shows the light path traveled by two light rays 91a and 93a traveling through the light guide 14. Light ray 91a strikes land 52 and is reflected towards the distal end (not shown in FIG. 5) of the light guide 14 as ray 91b. Light ray 93a strikes primary reflector portion 70 of trailing facet 58 and is reflected upwardly through output surface 20 towards gating device 16 (shown in FIG. 1) as light ray 93b. If gating device 16 is suitably modulated, then light wave 93b will pass through gating device 16 towards a viewer.

As shown in FIG. 5, the vertices between the leading facets and plateaus can lie along a straight line. If the vertices lie along a straight line, and if the nominal light output surface is designated as a reference plane, then the angle θ between the reference plane and the straight line preferably is about 0.1 to about 6 degrees, or more preferably about 0.25 to 1.5 degrees. In one such embodiment, the trailing facet heights are constant along the length of the light guide. In another such embodiment, the trailing facet heights diminish from the input end of the light guide towards the distal or narrow end. In a further embodiment, the trailing facet heights diminish from the input end of the light guide towards the distal or narrow end, the plateau segment lengths are constant along the length of the light guide, and the leading facet heights diminish from the distal end of the light guide towards the input end by an amount sufficient so that the leading facet-plateau vertices lie along a straight line.

The vertices between leading facets and plateaus can if desired lie along a curved path. In one such embodiment, the trailing facet heights diminish from the input end of the light guide towards the distal or narrow end and the land segment lengths remain constant along the length of the light guide. In another such embodiment, the trailing facet heights are constant and the land lengths diminish from the input end of the light guide towards the distal or narrow end. In any event, the angle θ for a light guide whose leading facet plateau vertices lie along a curved path should be approximated by calculating the arctangent of the (difference between the input end and distal end thicknesses of the light guide, divided by the length of the light guide), as shown in the following formula:

$$\theta = \arctan((\text{input end thickness} - \text{distal end thickness})/\text{light guide length}).$$

The individual projections need not all be identical and need not all have the same angular orientation, shape or dimensions. However, for ease of manufacturing, generally it will be preferred to form projections whose plateau and facet segments have the same angular orientation and segment length from projection to projection. The land segments also can if desired be similar to one another in angular orientation and segment lengths. In certain embodiments, the projections can be spaced at a relatively coarser pitch near the light input end of the light guide, and at a relatively finer pitch towards the narrowest portion. This change in spacing can conveniently be accomplished by progressively decreasing the length of the land segments from the input end to the distal end (or narrowest portion) of the light guide.

Each leading facet preferably is planar although other shapes such as convex or concave shapes can be used if desired. The leading facets do not ordinarily reflect or transmit light rays from inside the light guide, and thus can have a less than optically smooth surface. However, care should be taken to avoid excessive surface roughness. That will help avoid ghosting and other visual artifacts that may arise due to backscattering of light within the light guide and consequent weak transmission of backscattered light through the leading facets. The leading facet heights preferably are about 0.001 to about 0.5 mm, more preferably about 0.002 to about 0.02 mm. The angle between the reference plane 37 and a leading facet preferably is about 90 degrees to about 45 degrees, more preferably about 85 to about 65 degrees.

Preferably, the plateaus have generally flat, optically smooth surfaces so as not to induce light extraction. The plateau segment lengths preferably are about 0.001 to about 1.5 mm, more preferably about 0.004 to about 0.12 mm. The angle θ between the reference plane 37 and a plateau preferably is about 0 to about 10 degrees, more preferably about 0 to about 2 degrees, with the plateau segments most preferably being parallel to the reference plane 37 (or in other words, θ most preferably is zero).

The trailing facet segments direct light toward the gating device 16. Preferably, the trailing facets are planar although they can have other shapes such as convex or concave shapes if desired. Preferably the trailing facets have generally flat, optically smooth surfaces so as not to induce scattering of the reflected light. The trailing facet heights preferably are greater than the leading facet heights, and more preferably are about 0.001 to about 1.5 mm, most preferably about 0.002 to about 0.12 mm.

The land segments of the light re-directing side reflect light by TIR toward the narrow portion or distal end of the light guide. Preferably the lands have generally flat, optically smooth surfaces so as not to induce scattering of the reflected light. As noted above, the land segments preferably can decrease in length along the length of the light guide. A preferred pitch is from about 0.06–12 projections per mm at the light input end and about 1–250 projections per mm at the distal end or narrowest portion of the light guide. A preferred land segment length is about 0.003 to about 15 mm, more preferably about 0.003 to about 1.2 mm. The angle between the reference plane 37 and a land can be about 0 to about 5 degrees, or alternatively about 0.5 to about 2 degrees. In some embodiments, the lands are tilted in the opposite direction from the wedge.

Figure 6:
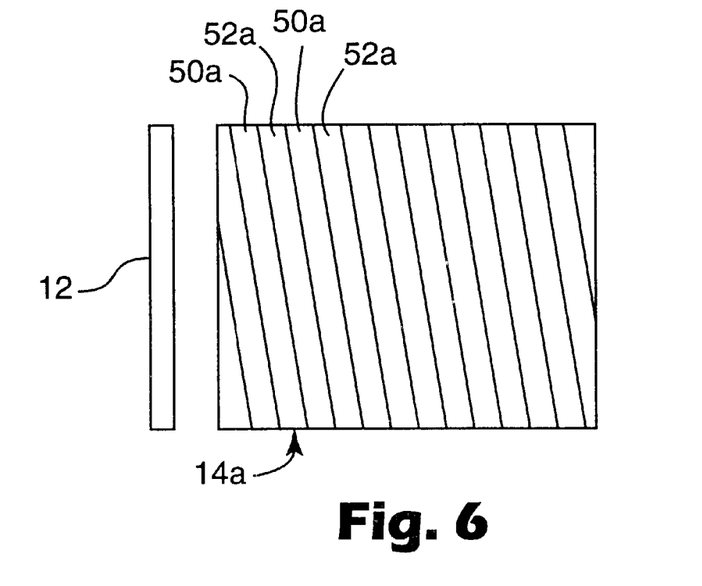
FIG. 6 is a bottom plan view of a second light guide in accordance with the principles of the present invention.
Figure 7:
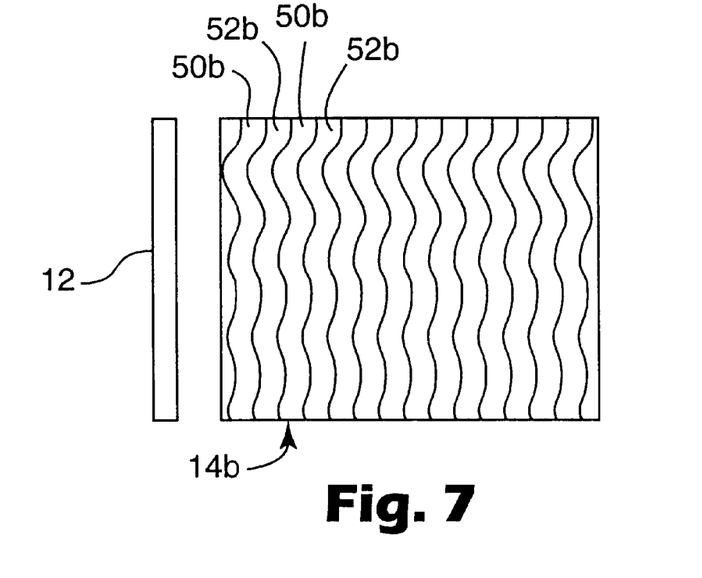
FIG. 7 is a is a bottom plan view of a third light guide in accordance with the principles of the present invention.

The projections can extend across the full width of the light re-directing side or can be in the form of shorter, less than full width segments, which can be aligned with one another in rows and columns or staggered from row to row. Rows of projections can be arranged in parallel to the light input surface or at an angle with respect to that surface. Preferably, the projections extend across the full width of the light re-directing side and are generally parallel to the light input surface. However, FIG. 6 is a plan view showing a light guide 14a with projections 50a and lands 52a that extend at an angle oblique relative to the light input surface. This oblique angling of the projections skews the projections relative to the pixel structure within the gating device to reduce the likelihood of a moiré pattern being generated. FIG. 7 shows a light guide 14b having projections 50b and lands 52b that curve in a serpentine pattern to avoid banding effects and to better randomize illumination. Projections 50a and 50b can have the same profile as the projections 50 of FIG. 5.

Figure 8:
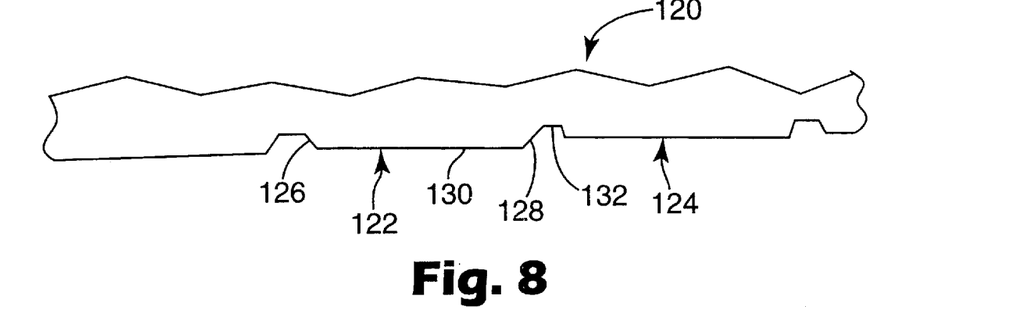
FIG. 8 is a side profile of a fourth light guide in accordance with the principles of the present invention.

It has been discovered that, by increasing the size of the plateaus relative to the size of the lands, it is possible to increase the proportion of the light escaping through the facets that is recaptured by the adjacent facets. FIG. 8 shows a light guide 120 that uses this discovery. Light guide 120 has extraction structures such as extraction structure 122 and extraction structure 124. Extraction structure 122 has a leading facet 126, a trailing facet 128, and a plateau 130. Land 132 separates extraction structures 122 and 124. Generally it is desirable that the total area of the plateaus on a light guide be greater than the total area of the lands. Alternatively phrased, most of the plateaus should have an area greater than the area of either of the adjacent lands.

Figure 9:
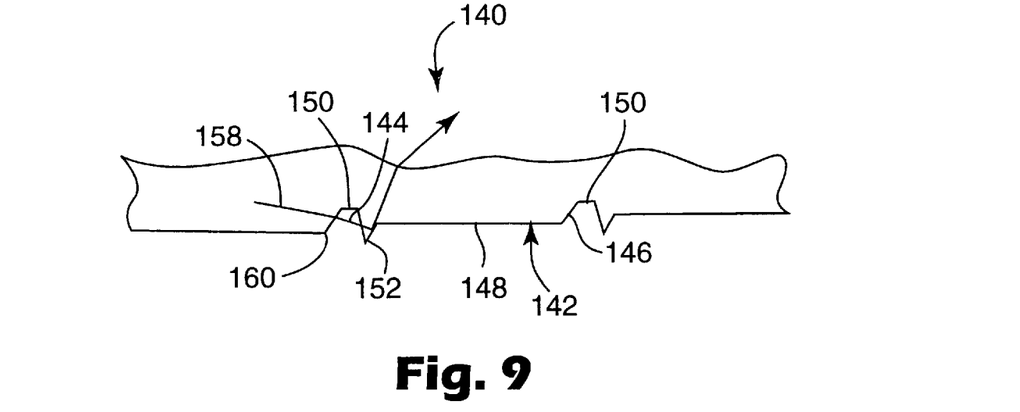
FIG. 9 is a side profile of a fifth light guide in accordance with the principles of the present invention.

FIG. 9 shows another structure that further increases the efficiency of a light guide according to the present invention. In the embodiment of FIG. 9, a light guide 140 has extraction structures such as extraction structure 142. Extraction structure 142 has a leading facet 144, a trailing facet 146, and a plateau 148. Adjacent extraction structures are separated by lands such as land 150. Additionally, extraction structure 142 has an protrusion 152 on the same side as leading facet 144. Light ray 158 strikes facet 160 at an angle less than the critical angle and thus is transmitted out of light guide 140. It then strikes the leading face of protrusion 152 and reenters light guide 140. Light ray 158 will then strike the trailing face of the protrusion 152 at an angle greater than the critical angle and undergo total internal reflection and emerge from the bottom of the light guide. Thus light that would have missed the leading facet 144 and have been emitted on the top of light guide 140 absent protrusion 152 is redirected to the desired direction. Preferably, the leading faces of protrusions such as protrusion 152 should have a height of least ten percent of the height of the leading facet of associated extraction structure. Although there is no limit on the maximum height of the riser of a protrusion, the practical limit is approximately one hundred percent of the height of the riser of associated extraction structure.

Figure 10:
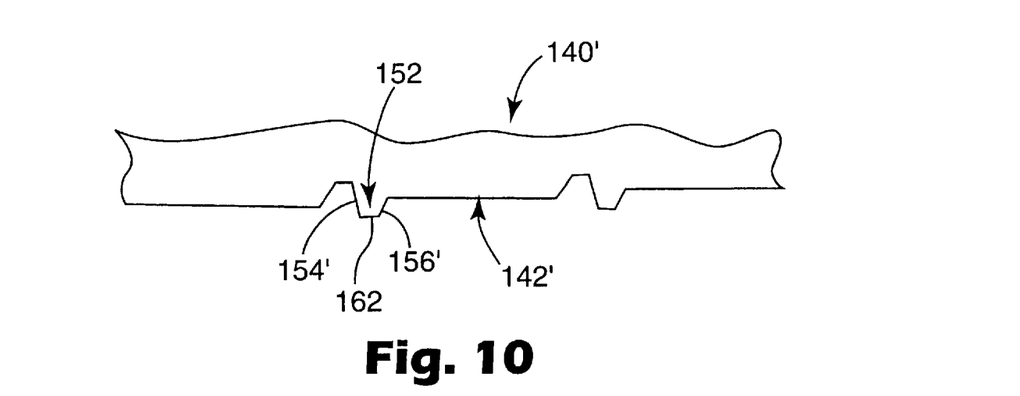
FIG. 10 is a side profile of a sixth light guide in accordance with the principles of the present invention.

FIG. 10 shows a slight variable on the embodiment of FIG. 9. In the embodiment of FIG. 10, a light guide 140' has an extraction structure 142'. Extraction structure 142' has a protrusion 152' which has a leading face 154' and a trailing face 156'. Protrusion 152' further has a plateau 162.

Figure 11:
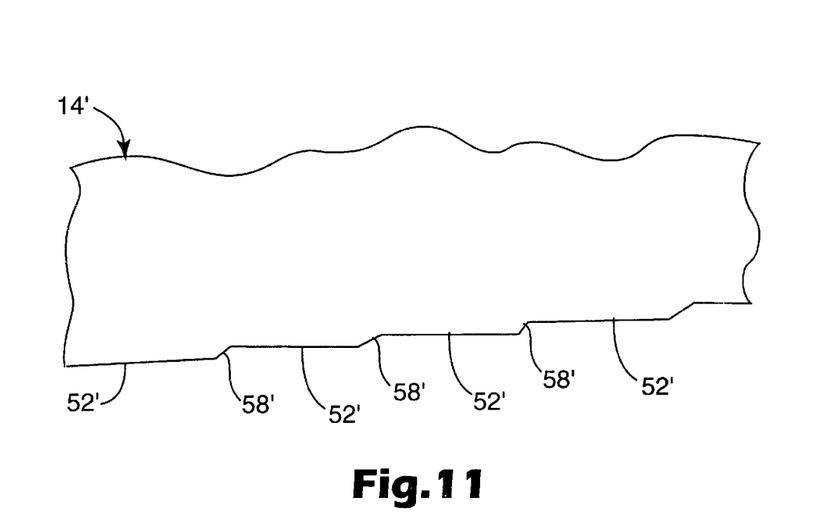
FIG. 11 is a schematic side profile of a seventh light guide in accordance with the principles of the present invention.

FIG. 11 shows a light guide 14' in accordance with the principles of the present invention where the leading facets have been reduced to zero such that no plateaus are defined. Instead, this embodiment includes a plurality of generally flat surfaces 52' offset from one another by facets 58'. The surfaces 52' function to direct light along the length of the light guide by total internal reflection. The facets 58' function to extract light from the light guide 14' by reflecting light toward the light output side of the light guide such that total internal reflection is frustrated.

Other extraction structures suitable for use in practicing the present invention can be found in U.S. patent application Ser. No. 09/669,932, entitled LIGHT GUIDE WITH EXTRACTION STRUCTURES, which has been assigned Attorney Docket No. 55244USA1B and which was filed on Sep. 26, 2000.

III. Light Output Side of Light Guide

Figure 12:
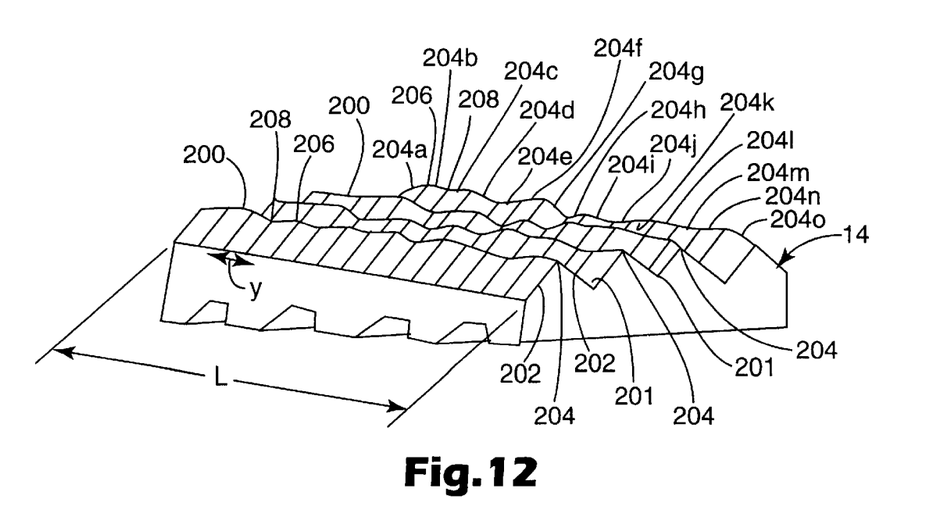
FIG. 12 is a top, front and side perspective view of the light guide of FIG. 4.

As schematically shown in FIG. 12, the light output side 20 of the light guide 14 includes a plurality of elongate prisms 200. The term "prism" will be understood to mean an optically transmissive body bound by two or more facets that is used to deviate or disperse a beam of light. The prisms 200 of the light guide extend side-by-side relative to one another along lengths L. Triangular grooves 201 separate the prisms 200.

The prisms 200 each include two facets 202 that preferably meet at an upper edge 204. In certain embodiments the upper edges 204 can be rounded. The upper edges 204 define heights H (shown in FIG. 13) of the prisms 200. Each of the upper edges 204 includes a plurality of edge segments 204a–204o having different rates of vertical slope. The rates of vertical slope (i.e., the magnitude and direction of slope) are preferably randomly varied for the edge segments 204a–204o of each prism 200. For example, the rates of slope can be randomly selected from a distribution of slope values (e.g., 32,000 or more slope values for some applications). It will be appreciated that the distribution of slope values can be flat or weighted (e.g., bell shaped). In other embodiments, the rates of slope can be selected in a non-random manner. For example, for some applications, it may be desirable to gradually decrease the magnitudes of slope along the length of a prism such that segments having the steepest rates of slope are positioned adjacent the light source. It will be appreciated that general design degrees of freedom allow the slopes to be selected to correspond with desired extraction efficiencies.

Figure 13:
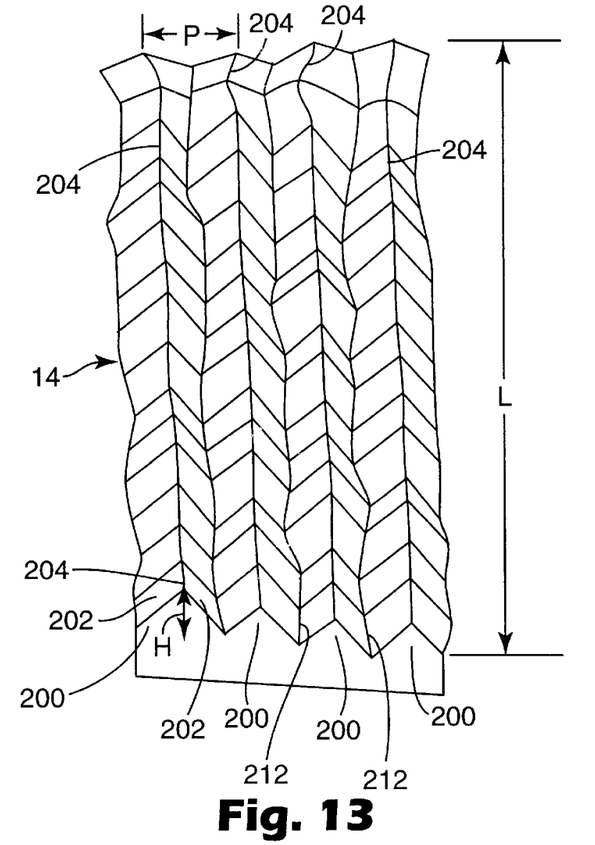
FIG. 13 is a top, front perspective view of the light guide of FIG. 12.

Referring to FIG. 12, the upper edges 204 of the prisms 200 define a plurality of peaks 206 and valleys 208. The peaks 206 and valleys 208 are defined at locations where adjacent edge segments have opposite directions of vertical slope (e.g., see edge segments 204a and 204b defining peak 206 and edge segments 204b and 204c defining valley 208). Adjacent edge segments can have different magnitudes and the same directions of vertical slope (e.g., see edge segments 204e and 204f). As best shown in FIG. 13, each upper edge 204 can also meander in a horizontal dimension (i.e., move from side to side thereby deviating from a single vertical plane) along the length L of each prism 200. In other embodiments, the valleys 208 may also meander in a horizontal direction.

As shown in FIG. 12, the heights of the peaks 206 and valleys 208 vary along the length of each prism 200. Preferably, the heights of the peaks 206 and valleys 206 are randomly varied.

In one non-limiting embodiment, the prisms 200 can have a nominal height of about 25 microns with the prism heights varying from 15 microns to 35 microns. The pitch p (shown in FIG. 13) of the prisms 200 preferably ranges from 10–100 microns. A more preferred range of pitch is from 24 to 50 microns. A most preferred pitch is 50 microns. Additionally, the included angle defined by the facets 202 of each prism 200 is preferably in the range of 70–120 degrees and more preferably in the range of 80–100 degrees. Most preferably, the included angle of the facets 202 is 90 degrees.

Referring to FIG. 12, each of the upper edge segments 204a–204o is shown having the same horizontal component y of length (e.g., 150 microns). The horizontal component y for each of the upper edge segments is preferably in the range of about 10–500 microns. While it is preferred for the edge segments to have constant horizontal components y, the horizontal components y for the upper edge section can also be varied from segment to segment.

Figure 14:
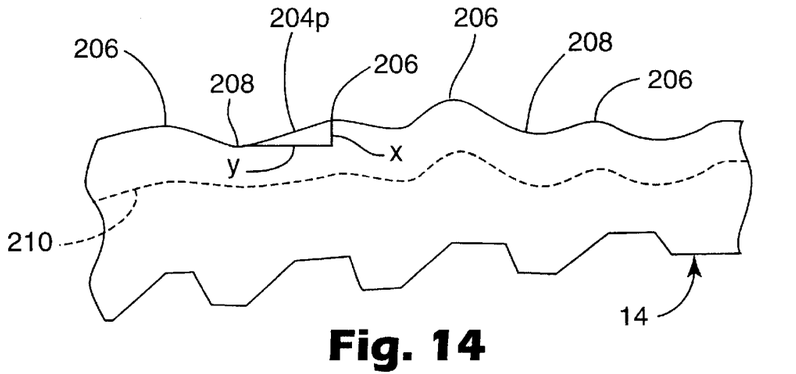
FIG. 14 is a side profile view of the light guide of FIG. 12.

As shown in the schematic views of FIGS. 12 and 13, the upper edges 204 include discrete peaks 206 and valleys 208 connected by straight lines. In actual practice, the edges 204 include rounded peaks 206 and valleys 208 interconnected by generally straight segments as shown in FIG. 14. In alternative embodiments, the straight segments could be replaced with curved segments.

In FIG. 14, a horizontal component y and a vertical component x of an upper edge segment 204p are labeled. It will be appreciated that the magnitude of slope of the edge segment 204p is determined by dividing the vertical component x by the horizontal component y. The direction of slope (i.e., positive or negative) is determined by whether the edge segment is ascending or descending. In a typical embodiment, the magnitude of slope of a given edge segment preferably will not exceed 10 degrees. Of course, larger magnitudes of slope could also be used.

Referring still to FIG. 14, a depth 210 of one of the grooves 201 is also shown. The depth 210 is defined by a lower edge 212 (see FIG. 13). Similar to the upper edge 204, the lower 212 edge preferably has a plurality of edge segments having different rates of slope.

In use, the prisms 200 of the light guide 14 can be configured to reflect light that is outside a predetermined viewing angle back into the light guide 14 so that the light is recycled. The prisms 200 can also be configured to direct light that passes through the light output side of the light guide toward a more preferred viewing angle. The variation in slope along the lengths of the prisms 200 assists in hiding the prisms 33 themselves and in masking imperfections. Also, the slope variations can be altered/designed to achieve desired lighting effects thereby providing greater design degrees of freedom.

IV. Illustrative Displays

FIG. 15 shows an illustrative recycling backlit display 10a in accordance with the principles of the present invention. The display 10a includes an optical stack 30 positioned between the light guide 14 and the light-gating device 16. Depending upon the display lighting characteristics desired, the optical stack 30 can include any number of different optical elements. For example, the stack is shown including a micro-prism film 32 such as a brightness enhancing film (e.g., a Brightness Enhancing Film Product such as BEFIII available from Minnesota Mining and Manufacturing Company, St. Paul, Minn.). Brightness enhancing films typically are designed to recycle/reflect light emitted from the light guide 14 that is outside a given angular range (e.g., see U.S. Pat. No. 4,906,070 that is hereby incorporated by reference in its entirety). The film 32 has prisms that face upwardly and extend in a direction parallel to the direction of the projections 50. The stack 30 also includes a reflective polarizing film 34 (i.e., a film that reflects one state of polarization and transmits the orthogonal state of polarization) such as a specular reflective polarizer film product sold by Minnesota Mining and Manufacturing Company under the name DBEF. Other suitable films include a diffuse reflective polarizing film sold by Minnesota Mining and Manufacturing Company under the name DRPF, a circular polarizer sold under the name NIPOCS by Nitto Denko, LTD. of Japan, or other films. The reflective polarizing film 34 preferably has a transmission axis that is aligned with a corresponding transmission axis of the gating device 16. Light not aligned with the transmission axis is reflected back to the light guide 14 and recycled. A "cleanup" polarizing film 36 having a transmission axis aligned with both the reflective polarizing film 34 and the gating device 16 can also be used. As previously described, for this type of application, the trailing facets 58 preferably define an angle α in the range of 20–40 degrees.

A reflective element 38 is shown positioned behind the light guide 14 to recapture light that escapes through the light re-directing side 22 of the light guide. The reflective element 38 is preferably a diffuse mirror. Films may also be added to provide polarization conversion (e.g., a quarter-wave plate). In this type of embodiment, the lands and plateaus 52 and 54 function as "windows" for allowing light reflected by the stack 30 to pass through the light re-directing side 22 of the light guide to reach the reflective element 38. The lands and plateaus 52 and 54 then allow the light to re-enter the light guide 14 after the light has been reflected by the reflective element 30.

FIG. 16 shows an illustrative one-pass backlit display 10b in accordance with the principles of the present invention. The display 10b includes a prismatic turning film 41 positioned between the light guide 14 and the gating device 16. Such turning film is used to re-direct light to an angular range that is preferred for viewing (e.g., a turning film can direct light to be more normally incident to the gating device 16). Exemplary films suitable for use as a turning film as shown in FIG. 16 are disclosed in U.S. Pat. Nos. 5,040,883 and 4,984,144, which are hereby incorporated by reference in their entireties. Preferably, the turning film has prisms 43 that face downwardly and extend in a direction parallel to the projections 50. Reflective element 38 (e.g., a specular reflective mirror) is shown positioned behind the light guide 14 to recapture light that escapes through the light re-directing side 22 of the light guide. As previously described, for this type of application, the trailing facets 58 preferably define an angle α less than 20 degrees.

V. Methods of Manufacture

Light guides in accordance with the present invention are preferably made by molding, embossing, curing or otherwise forming an injection moldable resin against a lathe-turned tool or other formed surface, made of metal or other durable material that bears a negative replica of the desired structured surface. Methods for making such formed surfaces and for molding, embossing or curing the light guides will be familiar to those skilled in the art. Preferably, the prisms 200 are integrally formed (i.e., formed as a single monolithic piece) with the light output side 20 of the light guide 14, and the projections 50 are integrally formed with the light re-directing side 22 of the light guide 14. In alternative embodiments, the prisms 200 or projections 50 can be formed on films that are mounted on the light guide 14 by conventional techniques (e.g., a lamination process).

Figure 17:
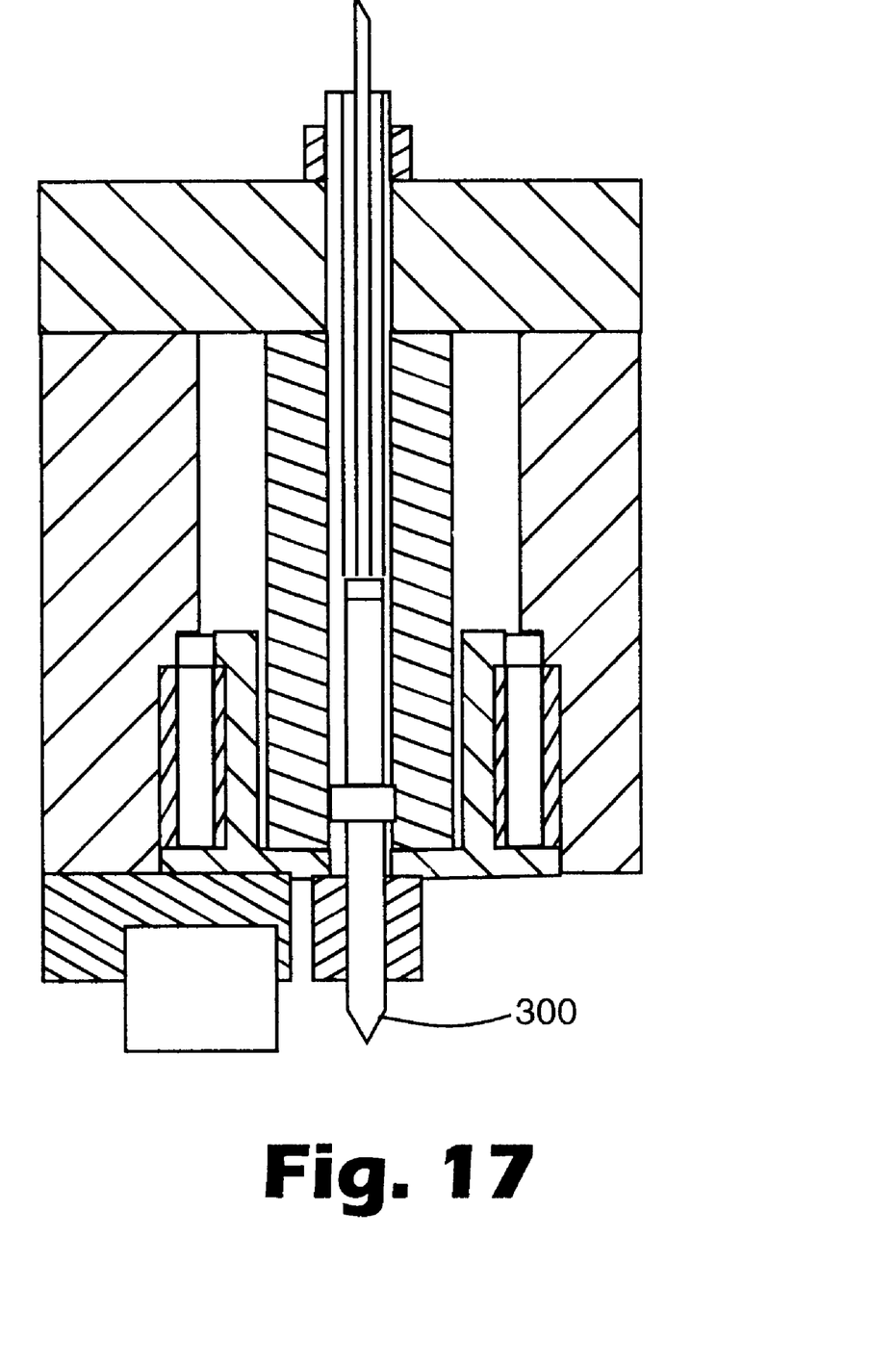
FIG. 17 shows a diamond cutting tool suitable for use in manufacturing light guides in accordance with the principles of the present invention.

A master for a tool used to form the prisms 200 in the light output side 20 of the light guide 14 can be made by diamond turning techniques. Typically, the master will have the same profile as the desired prism structure pattern, and will be used to make a forming tool having a negative replica of the desired prism structure. By way of example, a master for the tool can be made by diamond turning on a cylindrical blank known as a roll. The surface of the roll is typically of hard copper, although other materials may be used. A diamond cutting tool 300 (shown in FIG. 17) is used to cut a groove having a triangular cross-section into the roll. Preferably, a continuous groove is cut into the roll while the diamond tool 300 is moved in a direction transverse to the turning roll (i.e., in a direction parallel to the axis of rotation of the roll). If a constant pitch (e.g., a 50 micron pitch) between prisms is desired, the tool 300 is moved at a constant velocity. During the cutting process, the tool 300 is plunged radially into the drum and pulled radially outwardly from the drum to provide the prisms with different rates of slope. In a preferred embodiments, the plunge depths range from 15–35 microns. By varying the speed at which the tool 300 is plunged or retracted while the roll rotates at a constant rate, different rates of slope are generated.

Various modifications and alterations of this invention will be apparent to those skilled in the art without departing from the scope and spirit of this invention. It should be understood that this invention is not limited to the illustrative embodiments set forth above. It should also be appreciated that all of the drawings referenced in the Detailed Description are schematic and not drawn to scale.

What is claimed is:

1. A light guide comprising:
   a light guide body including a light re-directing side positioned opposite from a light output side, the light guide body also including a light input side that extends between the light re-directing side and the light output side and a distal side positioned opposite from the light input side;
   a plurality of elongate prisms located adjacent the light output side of the light guide body, the prisms extending side-by-side relative to one another along lengths, the prisms including upper edges defining heights of the prisms, the upper edges extending along the lengths of the prisms, and each upper edge including a plurality of edge segments having different magnitudes of slope;
   a plurality of generally flat first surfaces located adjacent the light redirecting side of the light guide body for directing light through the light guide body by total internal reflection, the generally flat first surfaces being positioned at different heights with the generally flat first surfaces being positioned progressively higher as one moves in a direction from the light input side of the light guide body toward the distal side of the light guide body; and
   extractor facets located adjacent the light re-directing side of the light guide body for reflecting light toward the light output side of the light guide body, the extractor facets being aligned at oblique angles relative to the generally flat first surfaces, and the extractor facets providing at least portions of the height differences between the generally flat first surfaces.

2. The light guide of claim 1, wherein the light re-directing side of the light guide body includes elongated projections each having a generally flat second surface defining a plateau segment, the elongated projections being separated by the generally flat first surfaces, the generally flat first surfaces being recessed relative to the plateau segments so as to define land segments, and the extractor facets extending from the plateau segments to the land segments.

3. The light guide of claim 2, wherein a total area of the plateau segments exceeds a total area of the land segments.

4. The light guide of claim 2, wherein at least some of the plateau segments define areas that exceed areas defined by adjacent land segments.

5. The light guide of claim 2, further including projections that project outwardly from the plateau segments.

6. The light guide of claim 1, wherein the light-guide body is generally wedge-shaped.

7. The light guide of claim 2, wherein the plateau segments, the extractor facets and the land segments are planar.

8. The light guide of claim 3, wherein the area of the plateau segments is at least 8 times as large as the area of the land segments.

9. The light guide of claim 1, wherein the magnitudes of slope of the upper edge segments are randomly varied.

10. The light guide of claim 1, wherein the edge segments define peaks, and wherein at least some of the peaks of each prism have different heights.

11. The light guide of claim 10, wherein the heights of the peaks are randomly varied.

12. The light guide of claim 1, wherein the edge segments define valleys, and wherein at least some of the valleys of each prism have different depths.

13. The light guide of claim 12, wherein the depths of the valleys are randomly varied.

14. The light guide of claim 1, wherein the prisms are integral with the light output side of the light guide body.

15. The light guide of claim 2, wherein the elongated projections are integral with the light re-directing side of the light guide body.

16. The light guide of claim 2, wherein the elongated projections and the prisms are integral with the light guide body.

17. The light guide of claim 2, wherein the elongated projections are elongated in a direction generally transverse to the lengths of the prisms.

18. The light guide of claim 2, wherein the elongated projections curve in a serpentine pattern.

19. The light guide of claim 2, wherein the elongated projections are elongated in a direction that forms an oblique angle with the light input side.

20. The light guide of claims 1 or 2, wherein the extractor facets and the generally flat first surfaces define angles in the range of 20–40 degrees.

21. The light guide of claims 1 or 2, wherein the extractor facets and the generally flat first surfaces define angles in the range of 25–30 degrees.

22. The light guide of claims 1 or 2, wherein the extractor facets and the generally flat first surfaces define angles less than 20 degrees.

23. The light guide of claims 1 or 2, wherein the extractor facets and the generally flat first surfaces define angles less than 10 degrees.

24. The light guide of claim 2, wherein the extractor facets comprise trailing facets that define first sides of the projections, and wherein the projections also include leading facets that define second sides of the projections, the leading facets being positioned closer to the light input side of the light guide body than their corresponding trailing facets.

25. A light guide comprising:
   a wedge-shaped light guide body that narrows in thickness from a first end to a second end, the light guide body including a light re-directing side positioned opposite from a light output side, the light re-directing side and the light output side extending between the first and second ends, the light guide body further including a light input surface located at the first end, the light input surface extending between the light redirecting side and the light output side;
   a plurality of elongate prisms integral with the light output side of the light guide body, the prisms extending side-by-side relative to one another along lengths, the prisms including upper edges defining heights of the prisms, the upper edges extending along the lengths of the prisms, each upper edge including a plurality of edge segments having different magnitudes of slope, the magnitudes of slope varying randomly from edge segment to edge segment; and
   a plurality of light extraction structures integral with the light re-directing side of the light guide body for reflecting light toward the light output side, the light extraction structures including elongated projections each having a plateau segment and first and second facets, the elongated projections being separated by lands that are recessed relative to the plateau segments, the first and second facets extending from the plateau segments to the lands.

26. A display comprising:

a light source;

a light gating device;

a light guide for directing light from the light source to the light gating device, the light guide including:
- a light guide body including a light re-directing side positioned opposite from a light output side, the light guide body also including a light input side that extends between the light re-directing side and the light output side and a distal side positioned opposite from the light input side;
- a plurality of elongate prisms located adjacent the light output side of the light guide body, the prisms extending side-by-side relative to one another along lengths, the prisms including upper edges defining heights of the prisms, the upper edges extending along the lengths of the prisms, and each upper edge including a plurality of edge segments having different magnitudes of slope;
- a plurality of generally flat first surfaces located adjacent the light redirecting side of the light guide body for directing light through the light guide body by total internal reflection, the generally flat first surfaces being positioned at different heights with the generally flat first surfaces being positioned progressively higher as one moves in a direction from the light input side of the light guide body toward the distal side of the light guide body; and
- facets located adjacent the light re-directing side of the light guide body for reflecting light toward the light output side of the light guide body, the facets being aligned at oblique angles relative to the generally flat first surfaces, and the facets providing at least portions of the height differences between the generally flat first surfaces.

27. The display of claim 26, wherein the light guide body is wedge shaped.

28. The display of claim 26, further comprising a reflective element positioned beneath the light re-directing side of the light guide.

29. The display of claim 26, further comprising a reflective polarizing film positioned between the light gating device and the light output side of the light guide body.

30. The display of claim 26, further comprising a prismatic brightening film positioned between the light gating device and the light output side of the light guide body.

31. The display of claim 30, wherein the prismatic brightening film has prisms that face upwardly away from the light guide body.

32. The display of claim 31, wherein the light re-directing side of the light guide body includes elongated projections each having a generally flat second surface defining a plateau segment, the elongated projections being separated by the generally flat first surfaces, the generally flat first surfaces being recessed relative to the plateau segments so as to define land segments, and the facets extending from the plateau segments to the land segments.

33. The display of claim 31, wherein the prisms of the prismatic brightening film are transversely aligned relative to the elongated prisms of the light guide body.

34. The display of claim 31, further comprising a diffuse reflector positioned behind the light guide body.

35. The display of claims 31 or 32, wherein the facets and the generally flat first surfaces define angles in the range of 20–40 degrees.

36. The display of claims 31 or 32, wherein the facets and the generally flat first surfaces define angles in the range of 25–30 degrees.

37. The display of claim 26, further comprising a turning film positioned between the light guide and the light gating device, and wherein the facets and the generally flat first surfaces define angles less than 20 degrees.

38. The display of claim 26, further comprising a turning film positioned between the light guide and the light gating device, and wherein the facets and the generally flat first surfaces define angles less than 10 degrees.

* * * * *